United States Patent [19]

Shaw et al.

[11] Patent Number: 5,602,974
[45] Date of Patent: Feb. 11, 1997

[54] DEVICE INDEPENDENT SPOOLING IN A PRINT ARCHITECTURE

[75] Inventors: Lin F. Shaw; Chia-Chi Teng; Kenneth W. Sykes; Raymond E. Endres, all of Redmond, Wash.

[73] Assignee: Microsoft Corporation, Redmond, Wash.

[21] Appl. No.: 318,069

[22] Filed: Oct. 5, 1994

[51] Int. Cl.$^6$ ................................................. G06K 15/00
[52] U.S. Cl. ............................................. 395/114; 395/115
[58] Field of Search ............................. 395/114, 115, 395/117, 157, 164, 110, 112, 101

[56] References Cited

U.S. PATENT DOCUMENTS

| | | | |
|---|---|---|---|
| 4,698,688 | 10/1987 | Ochi et al. | 358/257 |
| 4,829,468 | 5/1989 | Nonaka et al. | 364/900 |
| 5,081,579 | 1/1992 | Komai et al. | 364/405 |
| 5,150,454 | 9/1992 | Wood et al. | 395/114 |
| 5,222,200 | 6/1993 | Callister et al. | 395/112 |
| 5,228,118 | 7/1993 | Sasaki | 395/112 |
| 5,268,993 | 12/1993 | Ikenoue et al. | 395/114 |
| 5,276,799 | 1/1994 | Rivshin | 395/162 |
| 5,287,194 | 2/1994 | Lobiondo | 358/296 |
| 5,287,434 | 2/1994 | Bain et al. | 395/114 |
| 5,299,296 | 3/1994 | Padalino et al. | 395/112 |
| 5,303,336 | 4/1994 | Kageyama et al. | 395/114 |
| 5,327,526 | 7/1994 | Nomura et al. | 395/115 |
| 5,353,388 | 10/1994 | Motoyama | 395/117 |
| 5,371,837 | 12/1994 | Kimber et al. | 395/114 |
| 5,386,503 | 1/1995 | Staggs et al. | 395/157 |
| 5,388,200 | 2/1995 | McDonald et al. | 395/157 |
| 5,388,201 | 2/1995 | Hourvitz et al. | 395/157 |
| 5,388,207 | 2/1995 | Chia et al. | 395/157 |

OTHER PUBLICATIONS

*Microsoft® Windows NT™System Guide*, Microsoft Corporation, Mar. 1993, Chapter 6, "Print Manager," pp. 173–201.

McClelland, Deke, *Macintosh® System 7.1: Everything You Need To Know*, 2d. ed., Sybex®, San Francisco, California 1993, p. 106–110, 379, 384–387.

*Primary Examiner*—Raymond J. Bayerl
*Assistant Examiner*—Steven P. Sax
*Attorney, Agent, or Firm*—Seed and Berry LLP

[57] ABSTRACT

Print jobs are automatically and transparently spooled in a device-independent format, such as an enhanced metafile format. The enhanced metafile format provides a format into which documents are readily converted and which occupies a minimal amount of storage space. Each spooled print job is asynchronously printed relative to a program that requested the print job. Such spooled print jobs are despooled in a background processor mode. An operating system provides the resources for converting a print job into enhanced metafile format and spooling the print job in the enhanced metafile format.

10 Claims, 8 Drawing Sheets

DEVICE INDEPENDENT SPOOLING IN A PRINT ARCHITECTURE

DESCRIPTION

1. Technical Field

The present invention relates generally to data processing systems and, more particularly, to the spooling of documents in a device independent fashion in a data processing system.

2. Background of the Invention

Certain conventional computer systems allow documents to be spooled in a raw data format. When spooling is completed, the raw data for the document is stored on a storage device in a spool file. The spooled document may then later be "de-spooled" to retrieve the data for the document from the storage and forward the data to the target printer.

One disadvantage of spooling in the raw data format is that the raw data format is device specific. The raw data must be sent to the target printer. If the target printer becomes unavailable, the whole process must be repeated again. Another drawback of spooling in the raw data format is that documents that are spooled in such a format typically occupy a large amount of storage space. Such spooling in the raw data format also suffers the additional drawback in that the conversion from abstract printer commands to the raw data format is often time-consuming.

SUMMARY OF THE INVENTION

In accordance with a first aspect of the present invention, a method is practiced in a computer system, such as a portable computer, having printers for printing documents and a storage device. In this method, a request from a requesting party to print a document on a selected one of the printers is received. The document is spooled so that it is stored on the storage device in a device-independent format. The document is then later de-spooled to print the document on the selected printer. Thus, where the computer system is a portable computer, the document may be spooled while the portable is disconnected from the printers and then later de-spooled when the portable computer is again connected to the printers.

In accordance with another aspect of the present invention, a method is practiced in a computer system having a storage device, printers for printing documents and a processor running an operating system and at least one other program. The operating system includes functions that the program may call to print documents on the printers. In this method, a request from a selected one of the programs to print a document on a selected one of the printers is received. The calls to the functions the programs may call to print documents on the printers are received from the selected program in order to print the document on the selected printer. The received calls are converted into information that is held in at least one enhanced metafile. This enhanced metafile is stored on the storage device. The enhanced metafile is retrieved and played back to print the document on a selected printer.

In accordance with a further aspect of the present invention, a method is practiced on a computer system having a workstation, printers for printing documents, and a print server that is responsible for controlling the printers. The workstation runs an operating system and an application program. A separate storage device is provided for the print server. In this method, a request is made by the application program to print a document on the selected one of the printers. The document is then spooled on the storage device of the print server in an enhanced metafile format.

In accordance with yet another aspect of the present invention, a computer system includes printers for printing documents, as well as a storage device for storing information. The computer system also includes a processor that runs an operating system and an application program. The operating system includes an interface through which the application program may request to print a document. The operating system also includes an enhanced metafile recorder for recording the request to the interface to print the document as a set of enhanced metafiles. The operating system additionally provides a spooler for causing the document to be spooled in a spool file that holds the set of enhanced metafiles produced by the enhanced metafile recorder.

In accordance with another aspect of the present invention, a distributed system includes printers for printing print jobs and a print server for controlling access to the printers. The print server includes a first spooler for spooling the print jobs and a storage device for storing the spooled print jobs. The distributed system also includes a workstation that runs an application program and an operating system. The operating system provides an enhanced metafile converter and a second spooler. The enhanced metafile converter converts a print job into an enhanced metafile format when the application program requests to print the print job on a selected one of the printers. The second spooler cooperates with the first spooler at the print server to spool the print job after it has been converted into the enhanced metafile format by the enhanced metafile converter.

BRIEF DESCRIPTION OF THE DRAWINGS

FIG. 6 is a flowchart illustrating the steps that are performed in processing function calls made by an application program to print a print job in the preferred embodiment of the present invention.

DETAILED DESCRIPTION OF THE INVENTION

The preferred embodiment of the present invention facilitates spooling of print jobs in a device independent format. In particular, the preferred embodiment of the present invention spools print jobs in the enhanced metafile format. Print jobs are easily and quickly converted into the enhanced metafile format for spooling. The enhanced metafile format has the additional advantage that it occupies substantially less space than typical raw data formats.

An enhanced metafile as used herein refers to the enhanced metafile format that is employed in the Microsoft WINDOWS NT Operating System, sold by Microsoft Corporation of Redmond, Wash. An enhanced metafile is a file that stores information for displaying or printing a picture in a device independent format. Metafiles are typically contrasted with bitmaps in that metafiles typically hold metadata that specify how to draw the associated picture rather than bitmaps of the associated picture.

Figure 1:
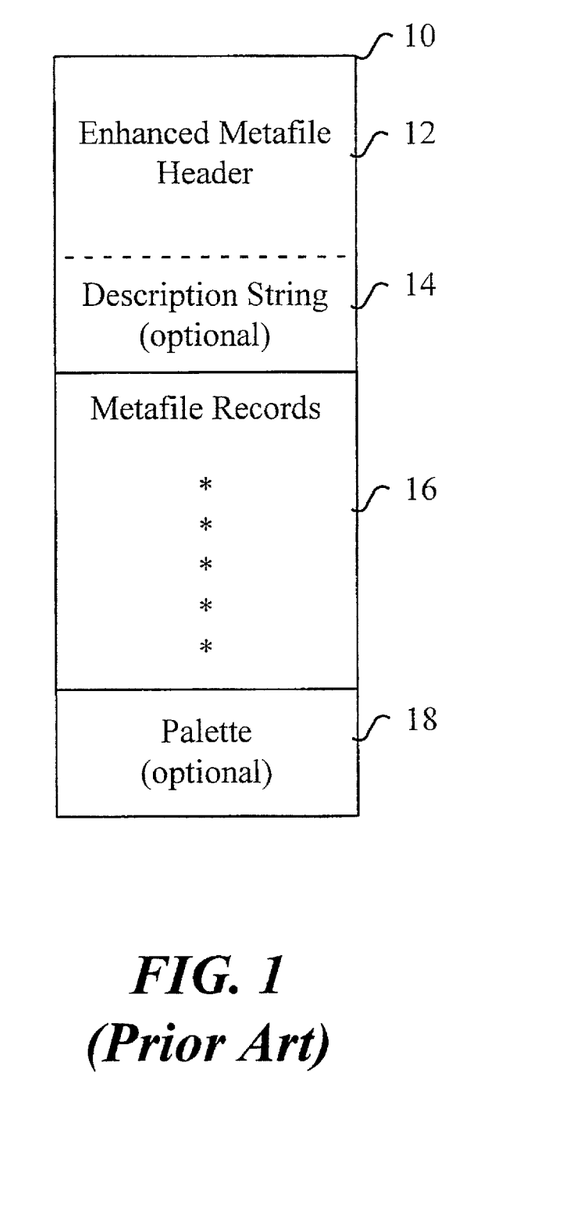
FIG. 1 illustrates the format of an enhanced metafile.

Before discussing how print jobs are spooled as enhanced metafiles, it is helpful to review the format of an enhanced metafile 10 (shown in FIG. 1). Each enhanced metafile 10 includes a header 12 and may optionally include a description string 14. The remainder of the enhanced metafile 10 is formed by metafile records 16 and an optional palette 18.

The enhanced metafile header 12 holds a number of different types of information, including dimension information, resolution information, version information and size information. Specifically, the enhanced metafile header is defined as follows (in C++ code):

```
typedef struct tagENHMETAHEADER
{
    DWORD    iType;         //Record type
                            //EMR_HEADER.
    DWORD    nSize;         //Record size in bytes. This
                            //may be greater than the
                            //size of
                            //(ENHMETAHEADER).
    RECTL    rclBounds;     //Inclusive-inclusive bounds
                            //in device units.
    RECTL    rclFrame;      //Inclusive-inclusive Picture
                            //Frame of metafile in
                            //.01 mm units.
    DWORD    dSignature;    //Signature. Must be
                            //ENHMETA_SIGNATURE.
    DWORD    nVersion;      //Version number.
    DWORD    nBytes;        //Size of the metafile in
                            //bytes.
    DWORD    nRecords;      //Number of records in the
                            //metafile.
    WORD     nHandles;      //Number of handles in the
                            //handle table.
                            //Handle index zero is
                            //reserved.
    WORD     sReserved;     //Reserved. Must be zero.
    DWORD    nDescription;  //Number of chars in the
                            //unicode description string.
                            //This is 0 if there is no
                            //description string.
    DWORD    offDescription; //Offset to the metafile
                            //description record.
                            //This is 0 if there is no
                            //description string.
    DWORD    nPalEntries;   //Number of entries in the
                            //metafile palette.
    SIZEL    szlDevice;     //Size of the reference
                            //device in pixels.
    SIZEL    szlMillimeters; //Size of the reference
                            //device in millimeters.
} ENHMETAHEADER;
```

The optional description field 14 of the enhanced metafile 10 is used to hold a written description that identifies what is contained within the enhanced metafile.

The enhanced metafile records 16 form the core of the enhanced metafile 10. Each enhanced metafile record 16 corresponds to a graphics device interface (GDI) function (which will be described in more detail below) for drawing the picture associated with the metafile. Each enhanced metafile record 16 has the following format.

```
typedef struct tagENHMETARECORD
{
    DWORD    iType;       //Record type EMR_XXX
    DWORD    nSize;       //Record size in bytes
    DWORD    dParm[1];    //DWORD Array of parameters
} ENHMETARECORD;
```

The iType field of the enhanced metafile record 16 holds a value that specifies the type of enhanced metafile record. Listed below is a sampling of the types of enhanced metafile records and their corresponding iType values.

| Record | Value | Record | Value |
|---|---|---|---|
| EMR_ABORTPATH | 68 | EMR_FILLPATH | 62 |
| EMR_ANGLEARC | 41 | EMR_FILLRGN | 71 |
| EMR_ARC | 45 | EMR_FLATTENPATH | 65 |
| EMR_ARCTO | 55 | EMR_FRAMERGN | 72 |
| EMR_BEGINPATH | 59 | EMR_GDICOMMENT | 70 |
| EMR_BITBLT | 76 | EMR_HEADER | 1 |
| EMR_CHORD | 46 | EMR_INTERSECTCLIPRECT | 30 |
| EMR_CLOSEFIGURE | 61 | EMR_INVERTRGN | 73 |
| EMR_CREATEBRUSHINDIRECT | 39 | EMR_LINETO | 54 |
| EMR_CREATEDIBPATTERNBRUSHPT | 94 | EMR_MASKBLT | 78 |
| EMR_CREATEMONOBRUSH | 93 | EMR_MODIFYWORLDTRANSFORM | 36 |
| EMR_CREATEPALETTE | 49 | EMR_MOVETOEX | 27 |
| EMR_CREATEPEN | 38 | EMR_OFFSETCLIPRGN | 26 |
| EMR_DELETEOBJECT | 40 | EMR_PAINTRGN | 74 |
| EMR_ELLIPSE | 42 | EMR_PIE | 47 |
| EMR_ENDPATH | 60 | EMR_PLGBLT | 79 |
| EMR_EOF | 14 | EMR_POLYBEZIER | 2 |
| EMR_EXCLUDECLIPRECT | 29 | EMR_POLYBEZIER16 | 85 |
| EMR_EXTCREATEFONTINDIRECTTW | 82 | EMR_POLYBEZIERTO | 5 |
| EMR_EXTCREATEPEN | 95 | EMR_POLYBEZIERTO16 | 88 |
| EMR_EXTFLOODFILL | 53 | EMR_POLYDRAW | 56 |
| EMR_EXTSELECTCLIPRGN | 75 | EMR_POLYDRAW16 | 92 |
| EMR_EXTTEXTOUTA | 83 | EMR_POLYGON | 3 |
| EMR_EXTTXTOUTW | 84 | EMR_POLYGON16 | 86 |
| EMR_POLYLINE | 4 | EMR_SETBRUSHORGEX | 13 |
| EMR_POLYLINE16 | 87 | EMR_SETCOLORADJUSTMENT | 23 |

| Record | Value | Record | Value |
| --- | --- | --- | --- |
| EMR_POLYLINETO | 6 | EMR_SETDIBITSTODEVICE | 80 |
| EMR_POLYLINETO16 | 89 | EMR_SETMAPMODE | 17 |
| EMR_POLYPOLYGON | 8 | EMR_SETMAPPERFLAGS | 16 |
| EMR_POLYPOLYGON16 | 91 | EMR_SETMETARGN | 28 |
| EMR_POLYPOLYLINE | 7 | EMR_SETMITERLIMIT | 58 |
| EMR_POLYPOLYLINE16 | 90 | EMR_SETPALETTEENTRIES | 50 |
| EMR_POLYTEXTOUTA | 96 | EMR_SETPIXELV | 15 |
| EMR_POLYTEXTOUTW | 97 | EMR_SETPOLYFILLMODE | 19 |
| EMR_REALIZEPALETTE | 52 | EMR_SETROP2 | 20 |
| EMR_RECTANGLE | 43 | EMR_SETSTRETCHBLTMODE | 21 |
| EMR_RESIZEPALETTE | 51 | EMR_SETTEXTALIGN | 22 |
| EMR_RESTOREDC | 34 | EMR_SETTEXTCOLOR | 24 |
| EMR_ROUNDRECT | 44 | EMR_SETVIEWPORTEXTEX | 11 |
| EMR_SAVEDC | 33 | EMR_SETVIEWPORTORGEX | 12 |
| EMR_SCALEVIEWPORTEXTEX | 31 | EMR_SETWINDOWEXTEX | 9 |
| EMR_SCALEWINDOWTEXTEX | 32 | EMR_SETWINDOWORGEX | 10 |
| EMR_SELECTCLIPPATH | 67 | EMR_SETWORLDTRANSFORM | 35 |
| EMR_SELECTOBJECT | 37 | EMR_STRETCHBLT | 77 |
| EMR_SELECTPALETTE | 48 | EMR_STRETCHDIBITS | 81 |
| EMR_SETARCDIRECTION | 57 | EMR_STROKEANDFILLPATH | 63 |
| EMR_SETBKCOLOR | 25 | EMR_STROKEPATH | 64 |
| EMR_SETBKMODE | 18 | EMR_WIDENPATH | 66 |

Each enhanced metafile record 16 also includes an nSize field that specifies the size of the enhanced metafile record in bytes and a dParm field that holds an array of parameters.

The optional color palette field 18 of the enhanced metafile 10 holds a palette sequence for a foreground palette to be used when the picture associated with the enhanced metafile is drawn.

Figure 2:
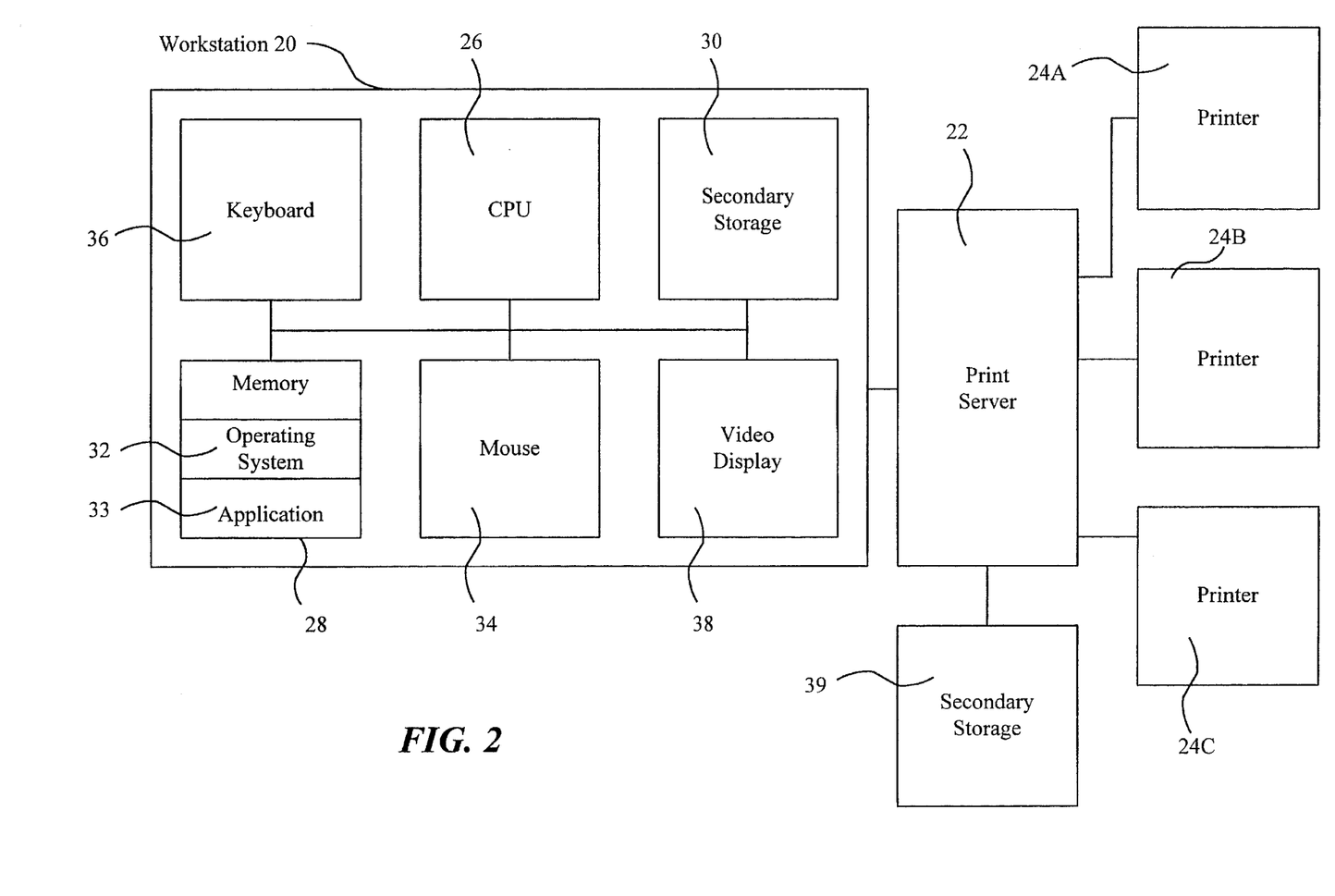
FIG. 2 is a block diagram illustrating a computer system that is suitable for practicing a preferred embodiment of the present invention.

FIG. 2 is a block diagram of an environment suitable for practicing the preferred embodiment of the present invention. This environment includes a workstation 20 that may communicate with a print server 22. The print server 22 is responsible for printers 24A, 24B, and 24C and includes its own secondary storage 39. A logical port is associated with each of the printers 24A, 24B, and 24C. Those skilled in the art will appreciate that the configuration shown in FIG. 2 is merely illustrative and that the present invention may be practiced in other environments as well.

The workstation 20 includes a central processing unit (CPU) 26 that has access to a memory 28 and a secondary storage 30. The memory 28 holds a copy of an operating system 32 and an application program 33 that may be run on the CPU 26. In the preferred embodiment of the present invention, the operating system 32 includes the Win32 API, such as found in Microsoft WINDOWS NT operating system. Moreover, the operating system 32 includes code for implementing enhanced metafile spooling as described herein. The workstation further includes input/output devices, such as a mouse 34, a keyboard 36 and a video display 38.

In the preferred embodiment of the present invention, a program, such as application program 33, initiates a request to print a document on one of the printers 24A, 24B, or 24C. Instead of the document being converted into a format specific to the selected printer, the document is converted into the enhanced metafile format and spooled. The application program 33 and the user believe the document has been printed in conventional fashion when the document has, instead, been spooled. The spooling of the document as an enhanced metafile is entirely transparent to the application program 33 and to the user. The spool file is then used to print the document as a background thread.

Figure 3:
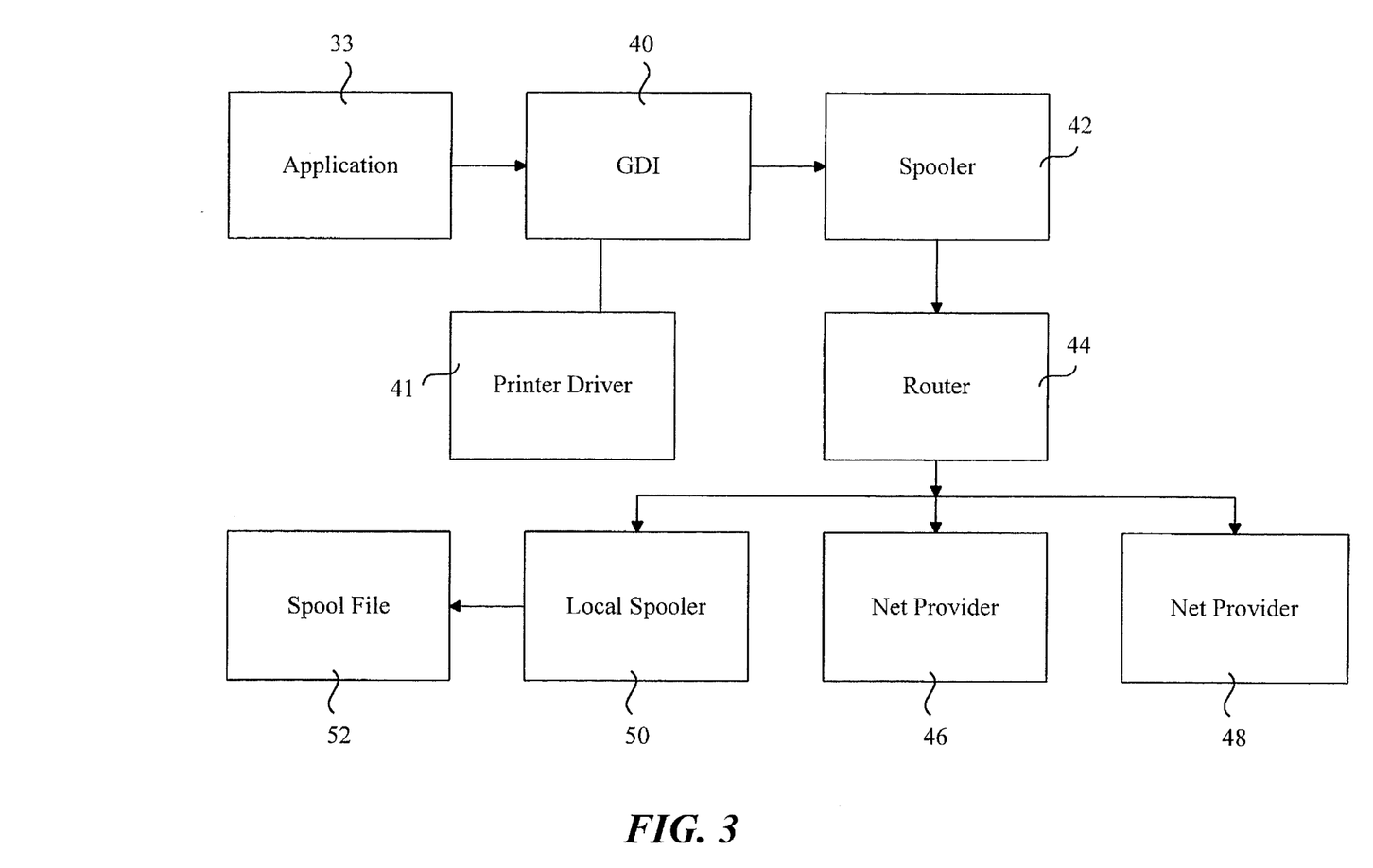
FIG. 3 is a block diagram illustrating components that play a role in enhanced metafile spooling in the preferred embodiment of the present invention.

FIG. 3 is a block diagram showing some of the software components and structures that play a role in the preferred embodiment of the present invention. The application program 33 is the program that initiates a printing request. Those skilled in the art will appreciate that the application program may be any type of program that is capable of initiating a printing request. The application program 33 initiates a printing request by making calls to functions in the graphical device interface (GDI) 40. The GDI 40 is part of the operating system 32 that serves as an interface between the application program 33 and lower level functions. The GDI 40 provides functions that the application program 33 may call to display graphics and formatted text. In the preferred embodiment of the present invention, the GDI 40 includes the 16-bit GDI and 32-bit GDI found in the Microsoft WINDOWS NT Operating System, as well as additional components. The GDI interacts with a printer driver 41 during creation of a spool file and during playback of the enhanced metafile records of the spool file.

The GDI 40 interacts with a spooler process 42, that is part of the operating system 32 run on the workstation 20. The spooler process 42 interacts with a router 44 to send print data and information to its appropriate destination. The router 44 is a printing component that locates the printer requested by the application program 33 and sends information from the workstation spooler 42 to the appropriate print server spooler. As the workstation 20 may be connected both to a local print server 22 (as shown in FIG. 2) and to other networks that include additional print servers for remote printers, the router 44 must decide where the requested printer is located. The router 44 sends information initially from the spooler 42 to the appropriate net provider 46 and 48 or local spooler process 50. For purposes of simplicity, in the example shown in FIG. 3, it is assumed that the information is passed to a local spooler 50. The local spooler 50 is responsible for creating the spool file 52 that holds the enhanced metafiles that are created for the document.

Figure 4:
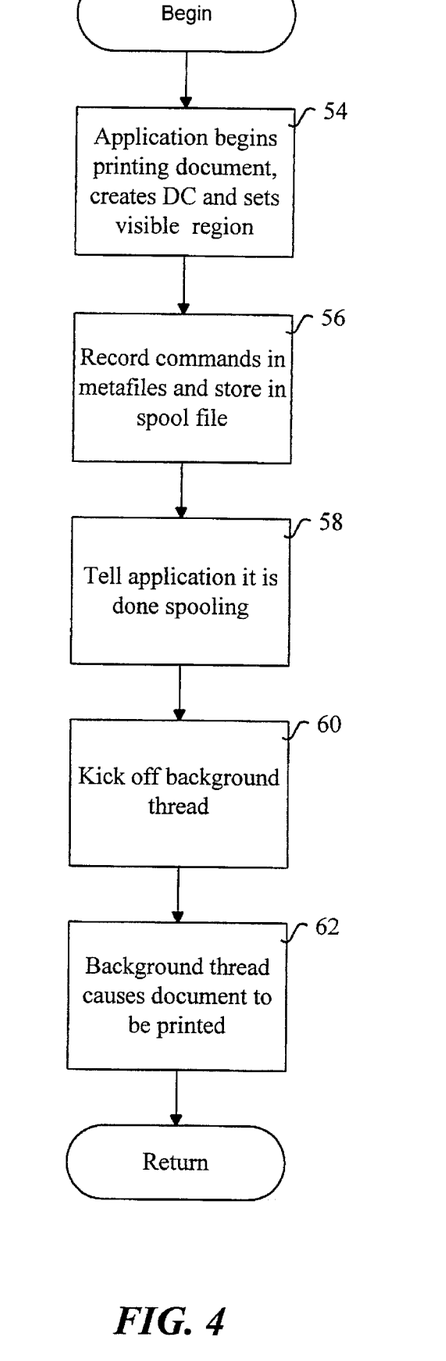
FIG. 4 is a flowchart that provides a overview of the steps performed in enhanced metafile spooling in the preferred embodiment of the present invention.

FIG. 4 is a flowchart showing the steps that are performed to print a document when enhanced metafile spooling is used in the preferred embodiment of the present invention. Initially, the application begins to print a document (step 54). In order to print a document, the application 33 must create a device context. The device context is a data structure that holds information about a graphics output device, such as a printer. These attributes determine how the functions of the GDI 40 work on the target printer. The application program 33 must first obtain a handle to a device context for the printer to which the application wishes to print. In addition, the window manager sets the visible region to be empty so that no output is produced when a GDI function is called. The window manager is part of the operating system 32 that is responsible for managing windows and the visible region is a structure maintained by the window manager to determine what is visible to a user in a window.

Figure 5:
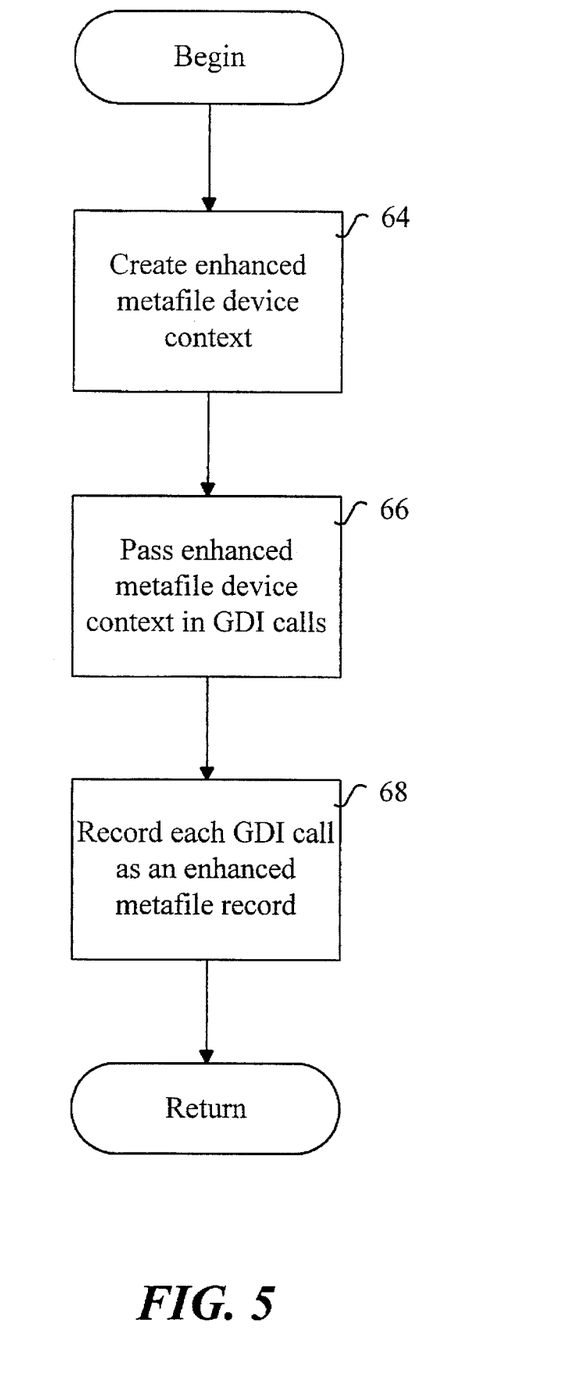
FIG. 5 is a flowchart illustrating the steps that are performed to convert a print job into enhanced metafile format in the preferred embodiment of the present invention.

In step 56, the document is converted into enhanced metafile format and stored in the spool file 52. FIG. 5 is a flowchart of the steps that are performed to store the document as a set of enhanced metafiles. Initially, a device context for the enhanced metafile is created by calling the CreateEnhMetaFile( ) function. This function creates a device context for an enhanced format metafile. This function is passed a number of parameters, including a handle to a reference device for the enhanced metafile. A handle is a numerical identifier that uniquely identifies a reference device. In this case, the handle to the reference device is a handle to the device context of the target printer.

The handle to the enhanced metafile device context returned by the function is then passed as a parameter to each of the GDI function calls that the application program 33 issues to print the document (step 66). The operating system 32 converts each GDI function into an enhanced metafile record and appends the record to the end of the enhanced metafile (step 68). The operating system 32 includes an enhanced metafile recorder for converting the GDI function calls to enhanced metafile records. Each page of the document is stored as a separate enhanced metafile as will be discussed in more detail below.

The operating system 32 has a means for differentiating between GDI function calls that are to be spooled in an enhanced metafile and those that are to be directly executed. FIG. 6 shows a flowchart of the steps that are performed in the preferred embodiment of the present invention to differentiate such GDI function calls and to record function calls in enhanced metafiles as required. Initially, the application program makes a GDI function call that passes the device context of the enhanced metafile as a parameter (step 70). Like other GDI function calls, this GDI function call is passed to a validation layer of the operating system 32 (step 72). The validation layer is responsible for examining the parameters of the function call to make sure that they are correct. The preferred embodiment of the present invention embellishes the validation layer to check whether the device context passed as a parameter to the GDI function call refers to an enhanced metafile (step 74). As described above, if the device context is an enhanced metafile, the enhanced metafile recorder is called to convert the GDI function call into an enhanced metafile record (step 76). Next, in order to maintain transparency of the enhanced metafile spooling, the preferred embodiment of the present invention is designed to call the GDI function so that the application program believes that the document is printing. The complication, however, is that the system does not desire for the GDI functions to produce output. Accordingly, the visible region used by a window manager is set to be empty so that no output is produced as discussed above. In step 80, the GDI function is called. If the device context is not for an enhanced metafile as checked in step 74, the GDI function is simply called directly (step 80).

Figure 7:
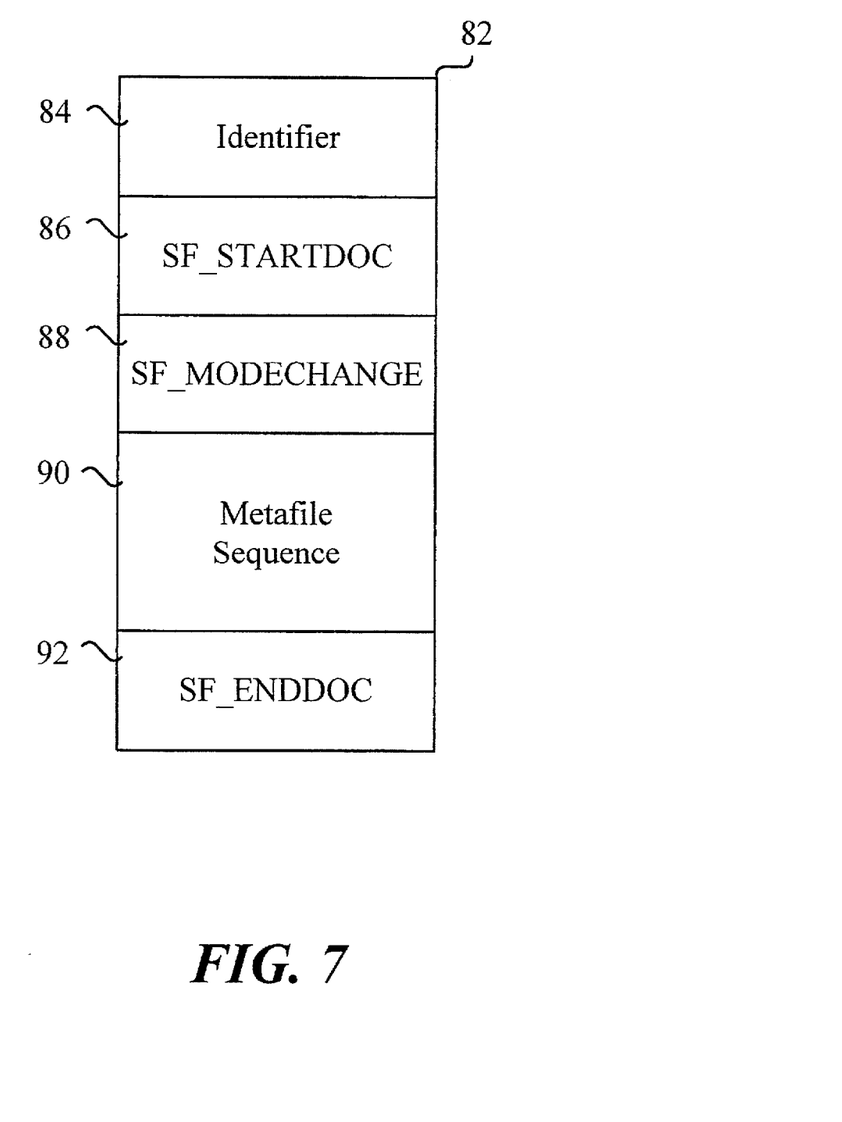
FIG. 7 illustrates the format of a spool file in accordance with the preferred embodiment of the present invention.

Returning to FIG. 4, step 56 involves recording the commands in the metafiles and storing the metafiles in a spool file. Two separate recorders are used to create the enhancement metafiles and the spool file. In particular, the spool file recorder is used to create the spool file and the spool file records contained therein. In contrast, the second recorder is responsible for converting graphics API calls into enhanced metafile records that are stored within the enhanced metafiles. FIG. 7 shows the format of such a spool file 82. The spool file 82 includes an identifier 84 that is 8 bytes in length. The spool file recorder is responsible for opening a new spool file, recording the identifier 84 and creating a SF_STARTDOC record in response to a STARTDOC command from the application program. The SF_STARTDOC record 86 has the following format:

```
typedef struct_SR_STARTDOC
{
    ULONG   iType;          //SF_STARTDOC
    ULONG   cj;             //Record length in bytes.
    ULONG   iOffDocName;    //Offset to DocName String
    ULONG   iOffOutput;     //Offset to Output String
} SR_STARTDOC, *PSR_STARTDOC,
FAR *LPSR_STARTDOC;
```

This record designates the start of the document within the spool file.

The SF_STARTDOC record 86 is followed by an SF_MODECHANGE record 88. The SF_MODECHANGE record 88 is followed by a DevMode structure that holds information such as paper orientation, paper size, paper length, paper width, color information and the like, which enables the document to properly be printed on the target printer.

Figure 8:
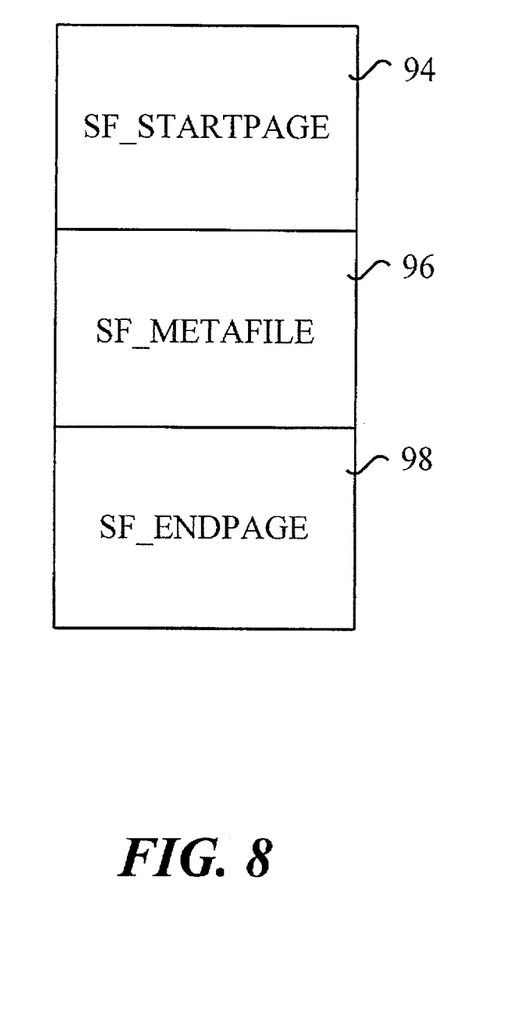
FIG. 8 illustrates a sequence of records that occurs in the metafile sequence of the spool file of FIG. 7.

The spool file 82 also includes a metafile sequence 90 that is created by the recorders. FIG. 8 shows an example of a series of records that are repeated within the metafile sequence 90. In particular, this sequence is repeated for each page of the document to be printed. The SF_STARTPAGE record 94 is created by the spool file recorder in response to the STARTPAGE command from the application program. An enhanced metafile is created in response to the STARTPAGE command to receive the contents of the page. The SF_STARTPAGE record 94 designates the start of a page of the document and has the following format:

```
typedef struct_SR_STARTPAGE
{
    ULONG   iType;      //SF_STARTPAGE
    ULONG   cj;         //Record length in bytes.
    USHORT  iPhysPage;  //Page number in the file. (1-N)
    USHORT  iFormat;    //Data format. (SFF_JOURNAL)
    ULONG   iLogPage;   //Page number according to
                        //the app.
} SR_STARTPAGE;
```

The SF_STARTPAGE record 94 is followed by an SF_METAFILE record 96 that holds the name of the metafile that has the information for the associated page. The metafiles are created by the second recorder, as discussed above. Specifically, the GDI graphics API calls are converted into metafile records that are held within the metafiles.

The SF_METAFILE record 96 is followed by an SF_ENDPAGE record that designates the end of the page. The SF_ENDPAGE record 96 is created by the spool file recorder in response to an ENDPAGE command from the application program. The ENDPAGE command indicates that the application is done drawing. The metafile is then closed and the name of the metafile is recorded in the SF_METAFILE record 94. The SR_ENDPAGE record has the following format:

```
typedef struct _SR_ENDPAGE
{
    ULONG iType;    //SF_ENDPAGE
    ULONG cj;
} SR_ENDPAGE;
```

The metafile sequence 90 (FIG. 7) is followed by an SF_ENDDOC record that is created in response to an ENDDOC command for the application. This record designates the end of the document and has the following format:

```
typedef struct _SR_ENDDOC
{
    ULONG iType;    //SF_ENDDOC
    ULONG cj;
} SR_ENDDOC;
```

As shown in FIG. 4, after the commands have been recorded in the metafiles and the metafiles stored in the spool file in step 56, the application program 33 is advised that it is done spooling the document (step 58). A background thread at the print server 22 for the port associated with the target printer is kicked off to print the spooled document (step 60). The background thread queues print jobs and then causes the document to be de-spooled and printed on the target printer (step 62). The operating system 32 includes functions for playing back enhanced metafiles so as to generate the picture on the printer that is associated with the enhanced metafiles. The PlayEnhMetaFile( ) function plays back the enhanced metafile records so as to produce the corresponding image. This function is one of those provided by the GDI.

The preferred embodiment of the present invention described herein provides several benefits. First, the turnaround time experienced by application programs is much faster because the application program is told that it is done spooling more quickly than in conventional systems. As was described above, print jobs may be quickly and easily spooled as enhanced metafiles. Moreover, the printing may occur asynchronously relative to the application program. The preferred embodiment of the present invention also provides device independence that allows a user to print pages at random, to print pages out of order, and to view the contents of the document on the screen without the necessity of the device driver for a target printer being installed. The device independence also allows a user to select any of a number of printers for printing a document. For example, the user may select a draft printer which is less expensive to use to print the document and proof the document. After the document has been proofed, the user may then request to print the document on a more expensive printer.

While the present invention has been described with reference to a preferred embodiment thereof, those skilled in the art will appreciate that various changes in form and detail may be made without departing from the intended scope of the claims as defined in the appended claims.

We claim:
1. In a computer system having a storage device, printers for printing documents and a processor running an operating system and at least one other program, said operating system including functions that the programs may call to print documents on the printers, a method comprising the steps of:

receiving a request from a selected one of the programs to print a document on a selected one of the printers;

receiving calls to the functions, that programs may call to print documents on the printers, from the selected program in order to print the document on the selected printer;

converting the received calls into information such that a separate enhanced metafile is provided for each page of the document to hold information for the page and storing the at least one enhanced metafile on the storage device in a device independent format that is independent of the formats for accepting documents for printing that are supported by the selected printer; and retrieving and playing back the at least one enhanced metafile to print the document on the selected printer.

2. The method of claim 1 wherein the converting step is done transparently relative to the selected one of the programs.

3. The method of claim 1 wherein the step of retrieving and playing back to print the document on the selected printer is performed asynchronously relative to the selected one of the programs.

4. The method of claim 1 wherein the computer system is a distributed system.

5. The method of claim 1 wherein the converting step is performed without a request to spool the document by the selected one of the programs.

6. The method of claim 1 wherein the step of converting the received calls and the step of retrieving and playing back the at least one enhanced metafile are performed transparently relative to the selected program.

7. The method of claim 1 wherein the step of retrieving and playing back the at least one enhanced metafile is performed asynchronously relative to the selected program.

8. The method of claim 1 wherein the operating system controls adjustable settings that determine whether visible output is produced in response to the calls to the functions that programs may call to print documents on the printers, and wherein the method further comprises the steps of:

adjusting the settings so that no visible output is produced when the functions are called; and completing the received calls to the functions.

9. The method of claim 1 wherein the computer system is a distributed system.

10. A computer-readable medium having computer-executable instructions for performing the steps of claim 1.

\* \* \* \* \*

UNITED STATES PATENT AND TRADEMARK OFFICE
CERTIFICATE OF CORRECTION

PATENT NO. : 5,602,974
DATED : February 11, 1997
INVENTOR(S) : Lin F. Shaw, Chia-Chi Teng, Kenneth W. Sykes, and Raymond E. Endres It is certified that error appears in the above-indentified patent and that said Letters Patent is hereby corrected as shown below:

In column 10, claim 1, line 12, please delete "convening", and insert --converting.--

Signed and Sealed this

Twenty-third Day of September, 1997

Attest:

BRUCE LEHMAN

*Attesting Officer*  *Commissioner of Patents and Trademarks*